(12) United States Patent
Carrières (10) Patent No.: US 8,086,068 B2
(45) Date of Patent: Dec. 27, 2011

(54) METHOD AND APPARATUS FOR PROVIDING AN INDICATION OF A LEVEL OF DISTORTION CREATED BY BLOCKING ARTIFACTS

(75) Inventor: Pascal Carrières, Pierrefonds (CA)

(73) Assignee: Miranda Technologies Inc., Montréal (CA)

( * ) Notice: Subject to any disclaimer, the term of this patent is extended or adjusted under 35 U.S.C. 154(b) by 846 days.

(21) Appl. No.: 12/062,129

(22) Filed: Apr. 3, 2008

(65) Prior Publication Data

US 2009/0252433 A1    Oct. 8, 2009

(51) Int. Cl.
*G06K 9/40*    (2006.01)
(52) U.S. Cl. ...................................................... 382/275
(58) Field of Classification Search .................. 382/275, 382/197, 199, 254, 260, 266
See application file for complete search history.

(56) References Cited

U.S. PATENT DOCUMENTS

| | | | |
|---|---|---|---|
| 4,591,789 A | 5/1986 | Glover et al. | |
| 5,144,688 A | 9/1992 | Bovir et al. | |
| 5,621,467 A * | 4/1997 | Chien et al. | 375/240.15 |
| 6,611,295 B1 | 8/2003 | Drouot et al. | |
| 7,110,612 B1 * | 9/2006 | Wang | 382/262 |
| 7,242,819 B2 * | 7/2007 | Jiang | 382/300 |
| 7,415,145 B2 * | 8/2008 | Hsieh et al. | 382/131 |
| 7,437,013 B2 * | 10/2008 | Anderson | 382/261 |

OTHER PUBLICATIONS

Mujis, R. and I. Kirenko, "A No-Reference Blocking Artifact Measure for Adaptive Video Processing", Proceedings of the 13th European Signal Processing Conference, Sep. 2005, Antalya.

* cited by examiner

*Primary Examiner* — Yon Couso
(74) *Attorney, Agent, or Firm* — Fasken Martineau DuMoulin LLP; Alexandre Abecassis (57) ABSTRACT

A method and apparatus are disclosed for providing an indication of a level of distortion created by blocking artifacts in an image comprising a plurality of pixels, the method comprising for each pixel in a first given direction, determining a corresponding gradient between the pixel and a neighboring pixel, for each pixel in the first direction, summing each of the corresponding determined gradient in a second direction to provide a plurality of gradient summing values, computing a level of distortion for each of at least one potential block size using at least one of the gradient summing values, determining an actual block size using the computed at least one level of distortion and providing the level of distortion corresponding to the determined actual block size.

22 Claims, 8 Drawing Sheets

METHOD AND APPARATUS FOR PROVIDING AN INDICATION OF A LEVEL OF DISTORTION CREATED BY BLOCKING ARTIFACTS

FIELD OF THE INVENTION

The invention relates to digital image processing. More precisely, this invention pertains to a method and apparatus for providing an indication of a level of distortion created by blocking artifacts.

BACKGROUND OF THE INVENTION

Artifacts are byproducts of digital compression methods such as JPEG and MPEG compression algorithms, which permanently discard some pixels.

The artifacts are especially noticeable in the case where high compression ratios are used thus causing large amounts of pixels to be discarded. As TV screens become larger, the distortions are now more and more noticeable by end users.

Blocking artifacts are a type of artifacts noticeable as abnormally large pixel blocks which are generated when an encoder cannot keep up with the allocated bandwidth. Those blocking artifacts are especially noticeable with fast motion sequences or quick scene changes.

In the case of a digital broadcast configuration, the broadcaster has to pay for a given bandwidth used for delivering a digital video program. On the other end of a transmission link, the end user is looking to receive a video program. The broadcaster may want to optimize the delivery of the digital video program by adjusting the compression algorithm used in order to modify an amount of bandwidth consumed. Such strategy is of great interest for the broadcaster. However the broadcaster may want in such case to be able to react to the appearance of blocking artifacts and reduce temporarily the compression ratio. There is therefore a need for a method for detecting blocking artifacts in an image.

U.S. Pat. No. 6,611,295 discloses an MPEG block detector. More precisely, the patent discloses a method for counting blocking artifacts as a function of their position in a grid. Unfortunately, the results provided may be subjective for the broadcaster since a first blocking artifact may have a larger impact than a second blocking artifact. Counting blocking artifacts therefore suffers from great limitations.

There is a need for a method and apparatus that will overcome at least one of the above-identified drawbacks.

Features of the invention will be apparent from review of the disclosure, drawings and description of the invention below.

BRIEF SUMMARY OF THE INVENTION

It is an object of the invention to provide an indication of the quality of a digital video picture without prior knowledge of the original picture or any information related to the encoding process or without any picture reference.

The invention provides a method for providing an indication of a level of distortion created by blocking artifacts in an image comprising a plurality of pixels, the method comprising for each pixel in a first given direction, determining a corresponding gradient between the pixel and a neighboring pixel, for each pixel in the first direction summing each of the corresponding determined gradient in a second direction to provide a plurality of gradient summing values, computing a level of distortion for at least one potential block size using at least one of the gradient summing values, determining an actual block size using the computed at least one level of distortion and providing the level of distortion corresponding to the determined actual block size.

The invention further provides an apparatus for providing an indication of a level of distortion created by blocking artifacts in an image comprising a plurality of pixels, the apparatus comprising a gradient summing values generating unit for receiving a plurality of pixels signal of said image and a block size signal and for providing a plurality of gradient summing values signal, the gradient summing values generating unit comprising means for determining, for each pixel in a first given direction, a corresponding gradient between the pixel and a neighboring pixel and means for summing, for each pixel in the first direction, each of the corresponding determined gradient in a second direction to provide the plurality of gradient summing values signal and a level of distortion determining unit for receiving the plurality of gradient summing values signal and the block size signal and for providing a level of distortion signal, the level of distortion determining unit comprising means for computing a level of distortion for each of at least one potential block size using at least one of the gradient summing values, the level of distortion determining unit further comprising means for determining an actual block size using the computed at least one level of distortion and means for providing the level of distortion corresponding to the determined actual block size.

BRIEF DESCRIPTION OF THE DRAWINGS

In order that the invention may be readily understood, embodiments of the invention are illustrated by way of examples in the accompanying drawings.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
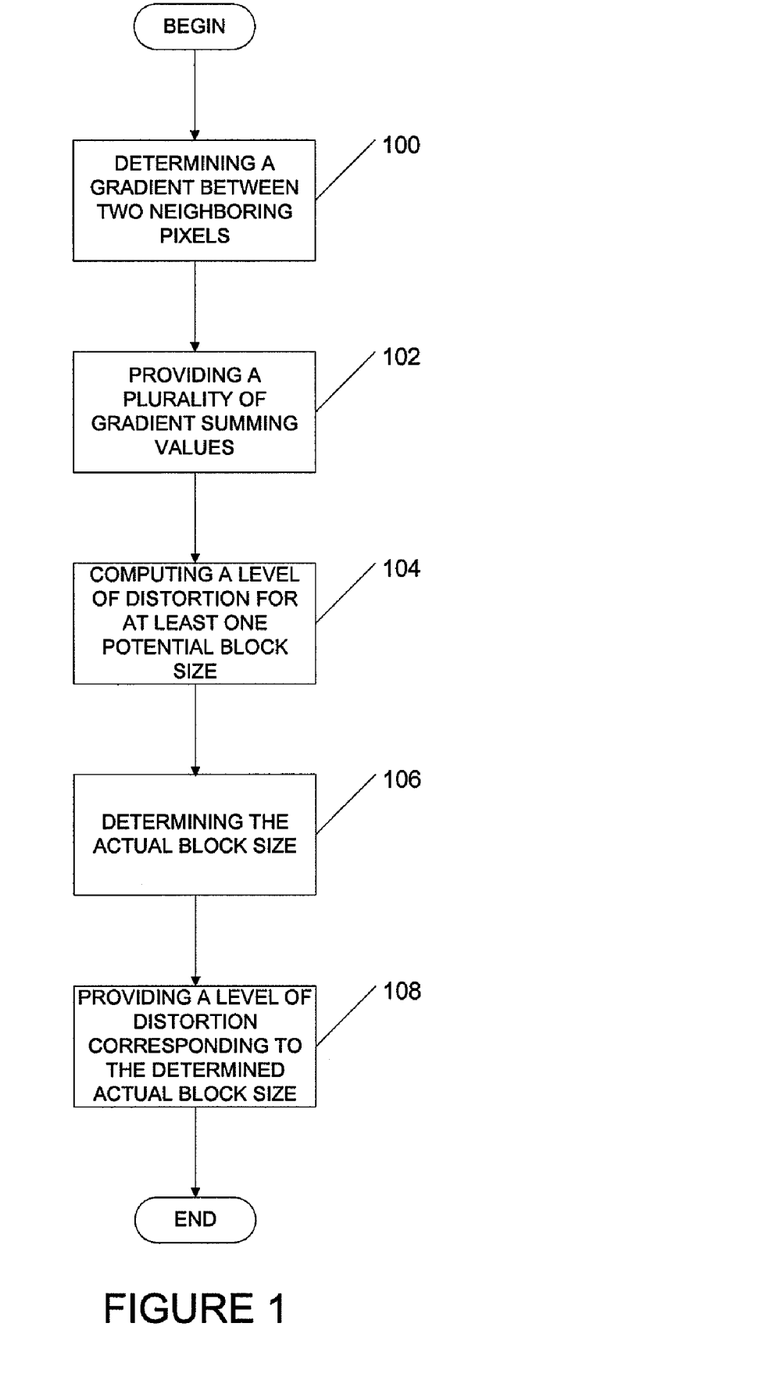
FIG. 1 is a flow chart which shows one embodiment of a method for providing a level of distortion created by blocking artifacts; according to a first processing step, a gradient between two neighboring pixels is determined; according to a second processing step, a plurality of gradient summing values is provided; according to a third processing step, a level of distortion for at least one potential block size is computed; according to a fourth processing step the actual block size is determined and according to a fifth processing step, a level of distortion corresponding to the determined actual block size is provided.

Now referring to FIG. 1, there is shown an embodiment of a method for providing a level of distortion corresponding to a determined actual block size. The method may be applied to an image or to a sequence of images.

According to processing step 100, a gradient between two neighboring pixels is determined. It will be appreciated by the skilled addressee that the gradient between two neighboring pixels is determined using the luminance component of the video signal. In an alternative embodiment, the gradient between two neighboring pixels may be further determined using an average of the chrominance component gradient of the video signal and the luminance component gradient of the video signal.

According to processing step 102, a plurality of gradient summing values is provided.

According to processing step 104, a level of distortion is computed for at least one potential block size.

According to processing step 106, an actual block size is determined.

According to processing step 108, a level of distortion corresponding to the determined actual block size is provided.

Figure 2:
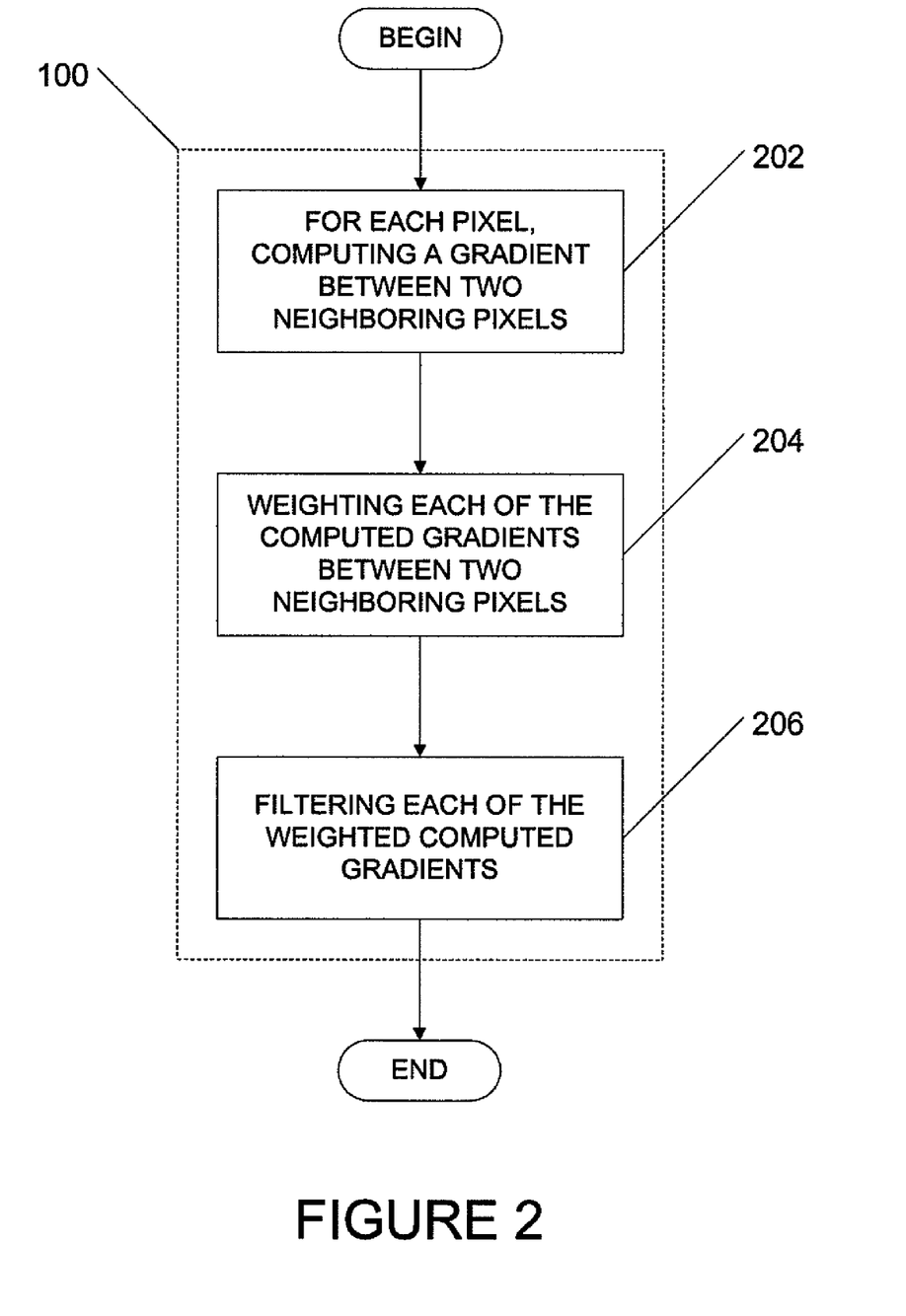
FIG. 2 is a flow chart which shows one embodiment for determining the gradient between two neighboring pixels; according to a first processing step, a gradient between two neighboring pixels is computed for each pixel; according to a second processing step, each of the computed gradients is weighted and according to a third processing step, each of the weighted computed gradients is filtered.

Now referring to FIG. 2, there is shown one embodiment for determining a gradient between two neighboring pixels.

According to processing step 202, a gradient between two neighboring pixels is computed for each pixel.

In one embodiment, the gradient is computed between two horizontal neighboring pixels P(i+1,j) and P(i,j). Alternatively, the gradient is computed between two vertical neighboring pixels.

The gradient $\text{Diff}_H$ is given by the formula $\text{diff}_H(i,j)=|P(i+1,j)-P(i,j)|$, where P(i,j) is the intensity of a pixel having the coordinates (i,j).

According to processing step 204, each of the computed gradients between two neighboring pixels is weighted.

In one embodiment, each computed gradient between two neighboring pixels is weighted using a sum of gradients $SDN_H$ computed over N neighbors. It has been contemplated that N should be smaller than an expected block size. In a preferred embodiment N=6 for MPEG-2-based video. Alternatively, smaller values of N may be used. The skilled addressee will appreciate that smaller values of N may be used to advantageously improve a processing speed.

In one embodiment $$SDN_H(i, j) = \sum_{k=-N, k \neq 0}^{N} \text{diff}_H(i+k, j).$$

Still in a preferred embodiment, each weighted computed gradient is given by the following formula $$WG_H(i, j) = \frac{\text{diff}_H(i, j)}{SDN_H(i, j)} \quad \text{when } SDN_H(i, j) > 0$$

$$WG_H(i, j) = \text{diff}_H(i, j)/(2*N) \quad \text{when } SDN_H(i, j) = 0.$$

Alternatively, and in the case where $SDN_H(i,j)=0$, other values may be used for the weighted computed gradient.

According to processing step 206, each of the weighted computed gradients is filtered.

Figure 3:
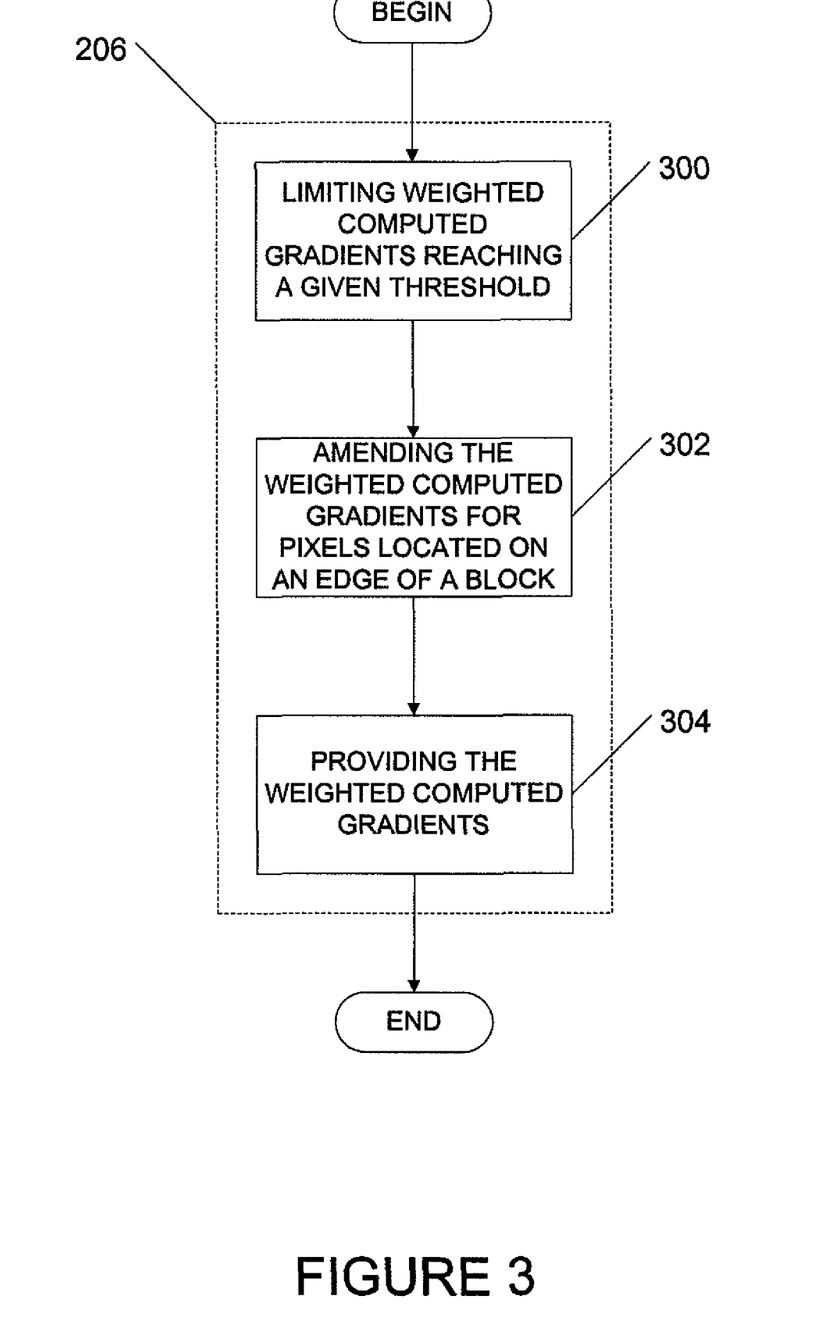
FIG. 3 is a flow chart which shows one embodiment for filtering each of the weighted computed gradients.

Now referring to FIG. 3, there is shown one embodiment for filtering each of the weighted computed gradients.

According to processing step 300, the weighted computed gradients reaching a given threshold T are limited by a given value. In a preferred embodiment, the given value is the value of the given threshold T.

It will be appreciated by the skilled addressee that in a preferred embodiment, the threshold T=4.

Accordingly and in a preferred embodiment, the filtered weighted computed gradients are given by the formulas $$CWG_H(i,j)=WG_H(i,j) \text{ when } WG_H(i,j)<T$$

$$CWG_H(i,j)=T \text{ otherwise}$$

According to processing step 302, each of the filtered weighted computed gradients for a pixel located on an edge of a block is amended.

It will be appreciated that in this processing step megablocks are detected. It has been contemplated that a megablock relates to a block made of adjacent similar smaller blocks.

In order to detect megablocks and according to one embodiment, for each pixel P(i,j) the megablock detection equation $(CWG_H(i-BS,j)>F_1*CWG_H(i,j))$ and $(CWG_H(i+BS,j)>F_1*CWG_H(i,j))$ and is $(CWG_H(i-BS,j)>F_2)$ and $(CWG_H(i+BS,j)>F_2)$ is evaluated, wherein BS is the block size of the smaller blocks comprised in the megablock to detect and $F_1$ $F_2$ are comparison factors. In a preferred embodiment, $F_1$ is equal to 1.5 and $F_2$ is equal to 1.5.

In the case where a given filtered weighted computed gradient matches the megablock detection equation, the given filtered weighted computed gradient is amended by the mean value of the filtered weighted computed gradient of the preceding edge and the filtered weighted computed gradient of the following edge in one embodiment. Alternatively and still in the case where a given filtered weighted computed gradient matches the megablock detection equation, the given filtered weighted computed gradient may be replaced the maximum or the minimum of the filtered weighted computed gradients of the preceding and the following edges.

In the case where a given filtered weighted computed gradient does not match the megablock detection equation, no amendment is performed on the given filtered weighted computed gradient.

According to processing step 304, the filtered weighted computed gradients are provided.

Figure 4:
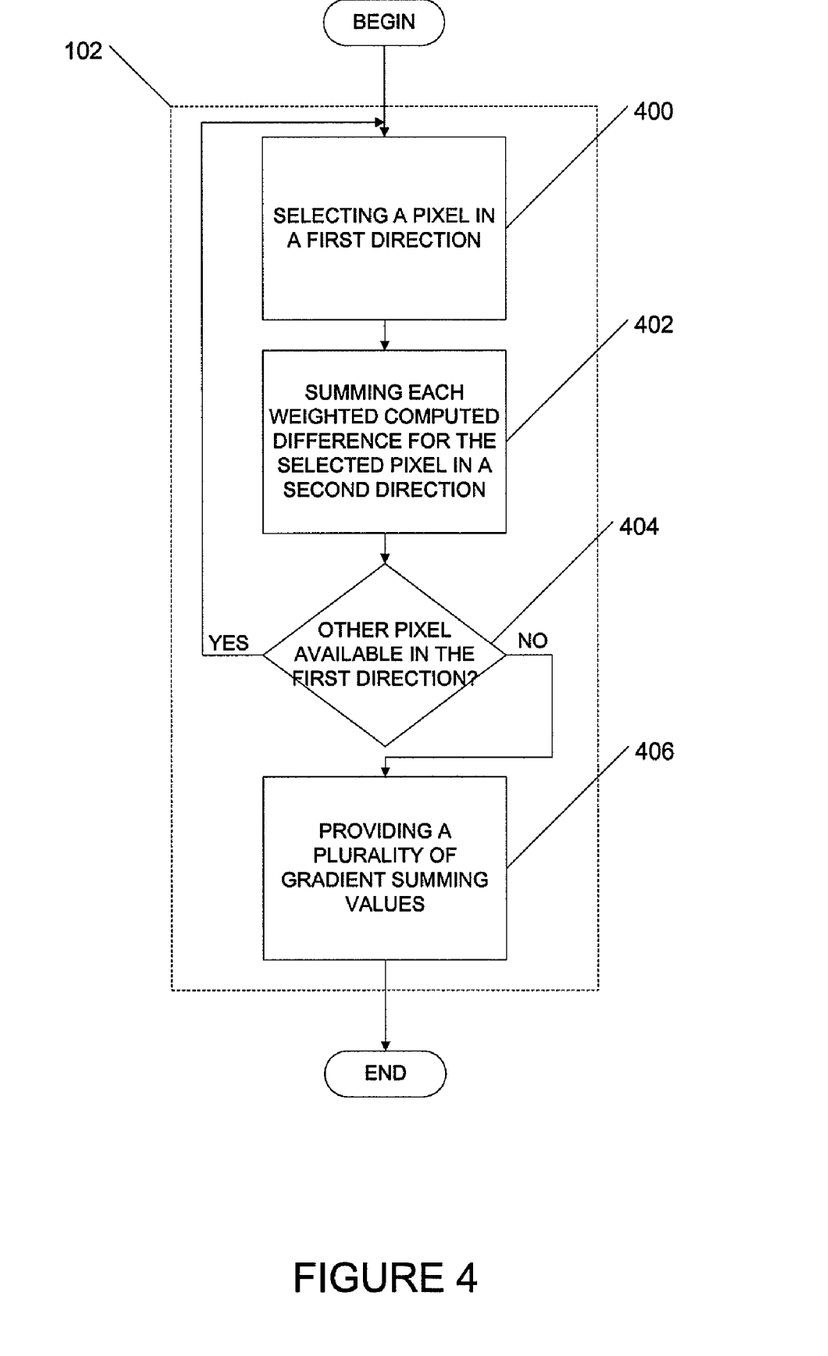
FIG. 4 is a flow chart which shows one embodiment for providing a plurality of gradient summing values.

Now referring to FIG. 4, there is shown one embodiment for providing a plurality of gradient summing values.

According to processing step 400, a pixel is selected in a first direction. It will be appreciated that in a preferred embodiment, the first direction relates to the horizontal direction. Alternatively and as mentioned above, the first direction may relate to a vertical direction.

According to processing step 402, each weighted computed gradient for the selected pixel is summed in a second direction. In a preferred embodiment, the second direction is the vertical direction. In the case where the first direction is the vertical direction, the second direction is the horizontal direction.

Accordingly, each gradient summing value GS(i,j) is given by the formula $$GS_H(i) = \sum_{j=1}^{NL} MCG_H(i, j),$$

wherein NL is a given number of lines. It will be appreciated that the number of lines NL may be the number of lines in a field, in a frame or in a certain amount of fields or frames. In a preferred embodiment, the number of lines NL represents a certain amount of lines in a frame.

According to processing step 404, a test is performed in order to find if another pixel is available in the first direction and if no other pixel is available in the first direction and according to processing step 406, a plurality of gradient summing values GS(i,j) is provided.

Figure 5:
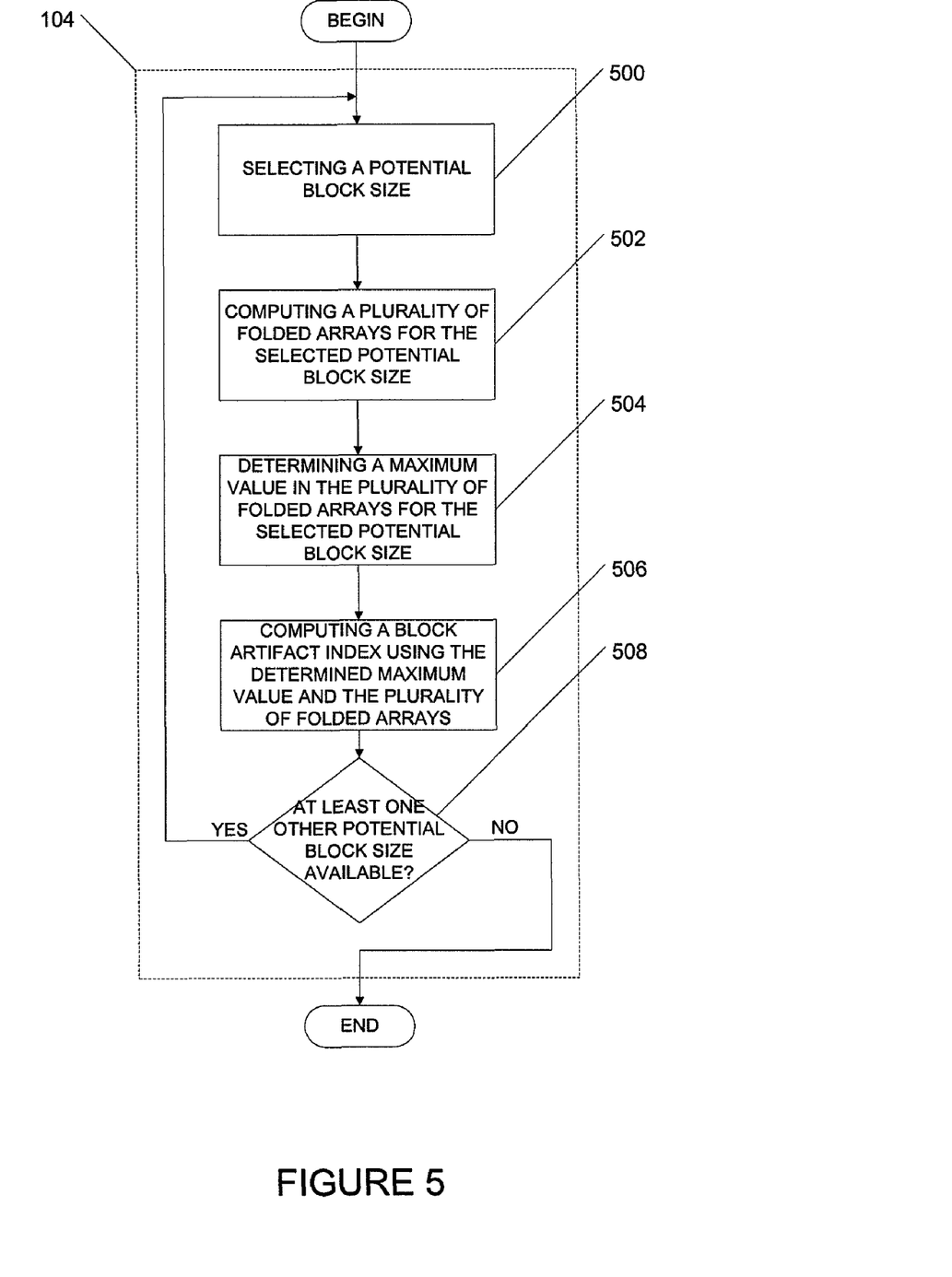
FIG. 5 is a flow chart which shows one embodiment for computing a level of distortion for at least one potential block size.

Now referring to FIG. 5, there is shown one embodiment for computing a level of distortion for at least one potential block size $BS_x$.

According to processing step 500, a potential block size $BS_x$ is selected. It will be appreciated that the potential block size $BS_x$ is selected from a group consisting of a plurality of potential block sizes. In a preferred embodiment, the potential block size $BS_x$ is selected from a group consisting of four (4), eight (8), ten (10), twelve (12) and sixteen (16).

According to processing step 502, a plurality of folded arrays $F_{HBS_x}(0), \ldots, F_{HBS_x}(BS_x-1)$ for the selected potential block size $BS_x$ is computed.

It will be appreciated that a folded array is computed in one embodiment using the formula $$F_{H_{BS_x}}(i \bmod BS) = \sum_{i=N}^{NP-N} GS_H(i),$$

where NP is the number of pixels in a line. It will be appreciated that a folded array may be computed according to various other embodiments.

According to processing step 504, a maximum value $MF_{HBS_x}$ in the plurality of folded arrays $F_{HBS_x}(0), \ldots, F_{HBS_x}(BS_x-1)$ for the selected potential block size $BS_x$ is determined.

The maximum value $MF_{HBS_x}$ is given by $MF_{HBS_x} = \max(F_{HBS_x}(0), \ldots, F_{HBS_x}(BS_x-1))$.

According to processing step 506, a blocking artifact index $BAI_{HBS_x}$ is computed using the determined maximum value $MF_{HBS_x}$ and the plurality of folded arrays $F_{HBS_x}(0), \ldots, F_{HBS_x}(BS_x-1)$.

More precisely and in one embodiment, the blocking artifact index $BAI_{HBS_x}$ is given by $$BAI_{H_{BS_x}} = \frac{(BS_x - 1) * MF_{H_{BS_x}}}{\left[\sum_{r=0}^{BS_x-1} F_{H_{BS_x}}(r)\right] - MF_{H_{BS_x}}}.$$

According to processing step 508, a test is performed in order to find out if at least one other potential block size $BS_x$ is available.

Figure 6:
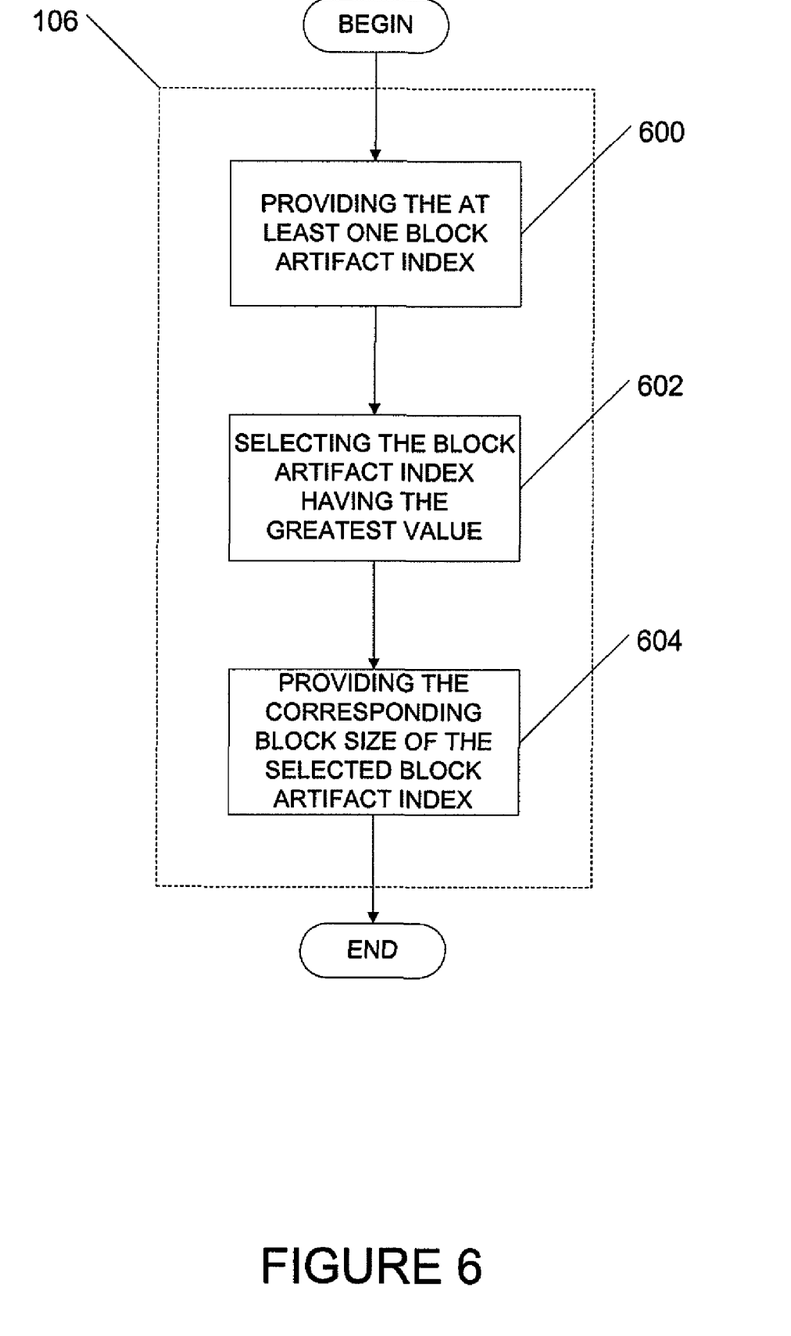
FIG. 6 is a flow chart which shows one embodiment for determining an actual block size.

Now referring to FIG. 6, there is shown one embodiment for determining the actual block size $BS_y$.

According to processing step 600, the at least one blocking artifact index $BAI_{HBS_x}$ is provided for each potential block size $BS_x$.

According to processing step 602, the blocking artifact index $BAI_{HBS_y}$ having the greatest value amongst the at least one blocking artifact index $BAI_{HBS_x}$ is selected.

According to processing step 604, the corresponding block size $BS_y$ of the selected blocking artifact index $BAI_{HBS_y}$ having the greatest value is provided.

Figure 7:
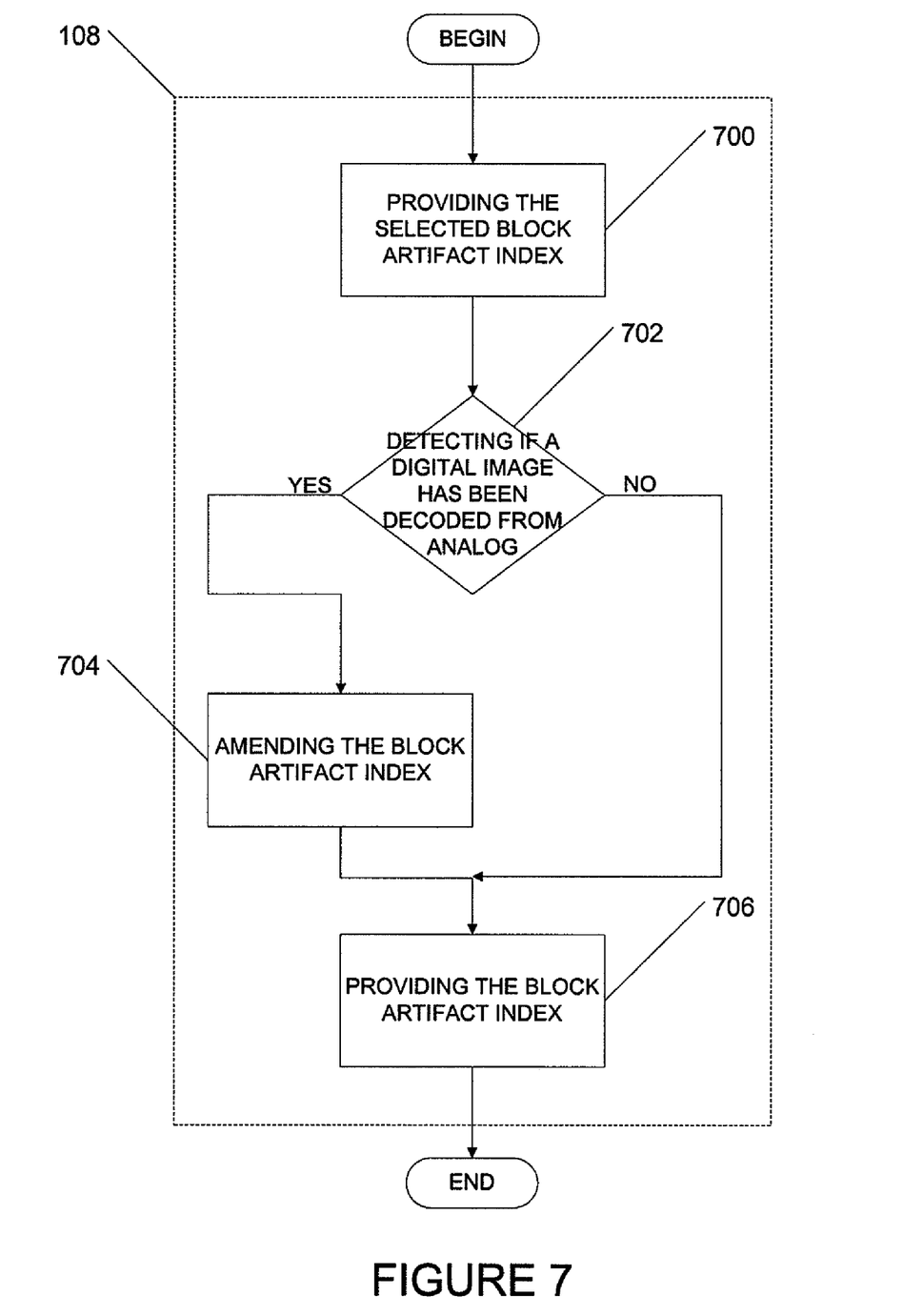
FIG. 7 is a flow chart which shows one embodiment for providing a level of distortion corresponding to the determined actual block size.

Now referring to FIG. 7, there is shown one embodiment for providing a level of distortion corresponding to the determined actual block size $BS_y$.

According to processing step 700, the selected blocking artifact index $BAI_{HBS_y}$ is provided.

According to processing step 702, a test is performed in order to detect if a digital image has been decoded from an analog source.

In fact, it has been contemplated that when a digital image has been decoded from an analog source, the blocking artifact index $BAI_{HBS_y}$ is substantially lower than the blocking artifact of a digital image that has not been encoded in analog. Accordingly, for any blocking artifact index greater than a given threshold $BAI_{MIN}$, it is possible to determine the type of video/image being analyzed.

According to one embodiment, $MF_{HBS_y}$ is compared to the second highest $F_{HBS_y}(r)$. In the case where $MF_{HBS_y}/F_{HBS_y}(r)$ is lower than $F_{MIN}$, the source was converted to analog at some point.

In one embodiment, $BAI_{MIN}=2$ and $F_{MIN}=1.5$.

In the case where the digital image is determined to have been decoded from an analog source and according to processing step 704, the blocking artifact index $BAI_{HBS_y}$ is amended. The amendment is performed in order to provide a blocking artifact index more representative of a level of blocking artifacts.

In one embodiment, the amendment involves two processing steps. It will be appreciated that in an alternative embodiment, the amendment may involve alternative processing steps.

According to a first processing step, at least one of the $F_{HBS_y}(r)$ is removed.

According to a second processing step, the blocking artifact index $BAI_{HBS_y}$ is amended $$BAI_{H_{BS_y}} = \frac{(BS_y - 4) * MF_{H_{BS_y}} * CF}{\left[\sum_{r=0, r \neq exceptions}^{BS_y-1} F_{H_{BS_y}}(r)\right] - MF_{H_{BS_y}}}$$

where CF is a correction factor equal to 1.7 in a preferred embodiment. The skilled addressee will appreciate that various other values may be provided for the correction factor CF based on the type of digital to analog converter or analog to digital converter used.

It has been contemplated that the exceptions are $r \neq (BGP_H-1) \bmod (BS_y), BGP_H, (BGP_H+1) \bmod (BS_y), (BGP_H+2) \bmod (BS_y)$.

According to processing step 706, the blocking artifact index is provided.

It will be appreciated that in an alternative embodiment, a type of video used may be manually specified according to a source type in order to simplify or reduce the resources required for the detection.

Moreover, while the blocking artifact index $BAI_{HBS_y}$ has been computed as explained above, it will be appreciated by the skilled addressee that in order to take into account horizontal as well as vertical blocking artifacts, a more accurate computed blocking artifact index may be computed using a horizontal blocking artifact index $BAI_H$ as well as a vertical blocking artifact index $BAI_V$. In such embodiment, the final computed blocking artifact index may be or not an average of the horizontal blocking artifact index and the vertical blocking artifact index. However, the skilled addressee will appreciate that in such embodiment more resources may be required for the implementation.

The skilled addressee will further appreciate that a temporal filtering may be further used to increase the stability of the value of the blocking artifact index. In a preferred embodiment, each blocking artifact index is filtered using fifteen (15) preceding values, a current value, and fourteen (14) following values.

It will be appreciated by the skilled addressee that once the actual block size $BS_y$ is determined, the Block Grid Position $BGP_H$ is revealed by finding the index position of $MF_{HBS_y}$ in $F_{HBS_y}(r)$ This means that $BGP_H$ has a range from 0 to $BS_y-1$. $P(i,j)$ is on the horizontal grid when $(i-1)\mod(BS_y)=BGP_H$. Similarly, $P(i,j)$ is on the vertical grid when $(j-1)\mod(BS_y)=BGP_V$. In the case where a plurality of images is provided, the block grid position $BGP_H$ may be revealed using previous revealed block grid positions.

Figure 8:
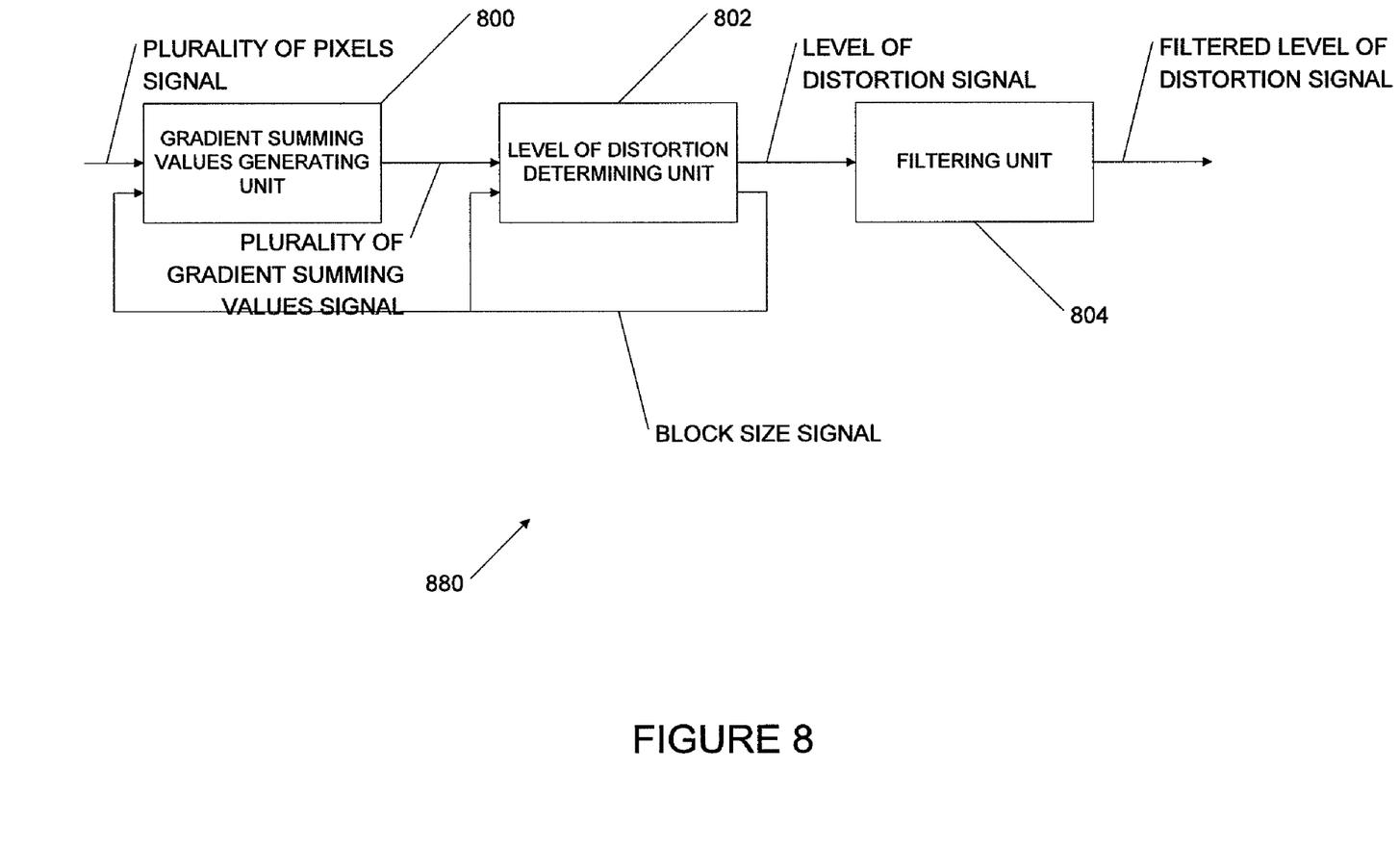
FIG. 8 is a block diagram which shows one embodiment for providing a filtered distortion level signal.

Now referring to FIG. 8, there is shown one embodiment of an apparatus 880 for providing a filtered level of distortion created by blocking artifacts signal (also referred to as filtered level of distortion signal). It will be appreciated that the apparatus for 880 may be used in various applications.

For instance, the apparatus 880 may be used after a decoder for checking a level of distortion created by blocking artifacts due to the parameters of a compression algorithm used by the corresponding encoder. In such case, the apparatus 880 receives a digital video signal comprising a plurality of pixels.

Alternatively, the apparatus 880 may be used by a broadcaster to check the quality of what has been delivered by a service provider.

Still in this embodiment, the apparatus 880 comprises a gradient summing values generating unit 800, a level of distortion determining unit 802 and an optional filtering unit 804.

The gradient summing values generating unit 800 receives a plurality of pixels signal of an image as well as an estimated block size signal and provides a plurality of gradient summing values signal. In one embodiment the gradient summing values generating unit 800 comprises means for determining, for each pixel in a first given direction, a corresponding gradient between the pixel and a neighboring pixel and means for summing, for each pixel in the first direction, each of the corresponding determined gradient in a second direction to provide the plurality of gradient summing values signal.

The plurality of gradient summing values signal is provided to the level of distortion determining unit 802. The level of distortion determining unit 802 generates a level of distortion signal and a block size signal.

The block size signal is used by the level of distortion determining unit 802 in order to determine the level of distortion signal as explained further above. In one embodiment, the level of distortion determining unit 802 comprises means for computing a level of distortion for each of at least one potential block size using at least one of the gradient summing values. The level of distortion determining unit 802 further comprises means for determining an actual block size using the computed at least one level of distortion and means for providing the level of distortion corresponding to the determined actual block size.

The level of distortion signal provided by the level of distortion determining unit 802 is provided to the filtering unit 804. The filtering unit 804 is used to filter the distortion level signal and to provide a filtered distortion level signal as explained above.

It will be appreciated that the gradient summing values generating unit 800, the level of distortion determining unit 802 and the filtering unit 804 may be implemented according to various embodiments. For instance, the gradient summing values generating unit 800 may be implemented using an FPGA; the level of distortion determining unit 802 and the filtering unit 804 may be implemented using a microprocessor. Alternatively, the gradient summing values generating unit 800, the level of distortion determining unit 802 and the filtering unit 804 may be implemented using a DSP.

It will be appreciated that at least one part of the method disclosed herein may be stored in machine executable instructions stored on a computer readable medium.

Although the above description relates to a specific preferred embodiment as presently contemplated by the inventor, it will be understood that the invention in its broad aspect includes functional equivalents of the elements described herein.

The invention claimed is:

1. A method for providing an indication of a level of distortion created by blocking artifacts in an image comprising a plurality of pixels, the method comprising:
   use of a processing unit for:
   for each pixel in a first given direction, determining a corresponding gradient between the pixel and a neighboring pixel;
   for each pixel in the first given direction, summing each of the corresponding determined gradient in a second direction to provide a plurality of gradient summing values;
   computing a level of distortion for each of at least one potential block size using at least one of the gradient summing values;
   determining an actual block size using the computed at least one level of distortion; and
   providing the level of distortion corresponding to the determined actual block size.

2. The method as claimed in claim 1, wherein said determining of a corresponding gradient between the pixel and a neighboring pixel comprises for each pixel in a first given direction, determining a corresponding gradient $diff_H(i,j)=|P(i+1,j)-P(i,j)|$ between pixel $P(i,j)$ and a neighboring pixel $P(i+1,j)$ and weighting each of the computed gradients.

3. The method as claimed in claim 2, wherein said weighting of each of the computed gradients comprises computing a corresponding sum of gradients $$SDN_H(i,j) = \sum_{k=N, k \neq 0}^{N} diff_H(i+k, j)$$

over a number of corresponding neighbors N and dividing each of the computed gradients by the corresponding sum.

4. The method as claimed in claim 3, wherein said number of corresponding neighbors N is equal to 6.

5. The method as claimed in claim 2, further comprising use of the processing unit for filtering each of the weighted computed gradients reaching a given threshold T.

6. The method as claimed in claim 5, wherein said threshold T is equal to 4.

7. The method as claimed in claim 5, wherein said filtering further comprises detecting a filtered weighted computed gradient corresponding to a pixel located on an edge of a block and amending a corresponding detected filtered weighted computed gradient for the pixel located on the edge of a block.

8. The method as claimed in claim 7, wherein said block has a block size $BS_y$, further wherein said detecting comprises checking if each corresponding filtered weighted computed gradient of each pixel located at a given distance equal to said block size $BS_y$ around a given pixel is greater than the filtered weighted computed gradient of the given pixel multiplied by a first comparison factor and if each corresponding filtered weighted computed gradient of each pixel located at a given distance equal to said block size $BS_y$ around a given pixel is greater than a second comparison factor.

9. The method as claimed in claim 8, wherein said first comparison factor is 1.5 and said second comparison factor is 1.5.

10. The method as claimed in claim 8, wherein said amending comprises replacing the filtered weighted computed gradient of the pixel located on an edge of a block by a mean value of the filtered weighted computed gradient of the pixel located on the following edge and the filtered weighted computed gradient of the pixel located on a proceeding edge of the block.

11. The method as claimed in claim 1, wherein said computing of a level of distortion for at least one potential block size $BS_x$ using at least one of the gradient summing values $GS_H(i,j)$ comprises selecting a potential block size; computing a plurality of folded arrays $F_{HBS_x}(0), \ldots, F_{HBS_x}(BS_x-1)$, wherein $$F_{HBS_x}(i \bmod BS_x) = \sum_{i=N}^{NP-N} GS_H(i)$$

for the selected potential block size $BS_x$ and computing a blocking artifact index $BAI_{HBS_x}$ for the selected potential block size $BS_x$ using the computed plurality of folded arrays $F_{HBS_x}(0), \ldots, F_{HBS_x}(BS_x-1)$.

12. The method as claimed in claim 11, wherein said potential block size $BS_x$ is selected from a group consisting of 4, 8, 10, 12 and 16.

13. The method as claimed in claim 11, further comprising use of the processing unit for computing a maximum value $MF_{HBS_x}$ for the plurality of folded arrays $F_{HBS_x}(0), \ldots, F_{HBS_x}(BS_x-1)$, further wherein said blocking artifact index $BAI_{HBS_x}$ is defined as $$BAI_{HBS_x} = \frac{(BS_x - 1) * MF_{HBS_x}}{\left[\sum_{r=0}^{BS_x-1} F_{HBS_x}(r)\right] - MF_{HBS_x}}.$$

14. The method as claimed in claim 1, wherein said determining of an actual block size $BS_y$ using the computed at least one level of distortion comprises selecting a maximum value of the computed at least one level of distortion.

15. The method as claimed in claim 1, wherein said providing of said level of distortion corresponding to the determined actual block size comprises performing a temporal filtering of the level of distortion.

16. The method as claimed in claim 1, wherein said providing of said level of distortion corresponding to the determined actual block size comprises detecting if the image has been decoded from an analog source and amending said level of distortion if said image has been decoded from an analog source.

17. The method as claimed in claim 1, wherein said providing of said level of distortion corresponding to the determined actual block size comprises providing a block grid position.

18. A computer readable medium for storing machine executable instructions which when executed perform the method as claimed in claim 1.

19. An apparatus for providing an indication of a level of distortion created by blocking artifacts in an image comprising a plurality of pixels, said apparatus comprising:
a gradient summing values generating unit for receiving a plurality of pixels signal of said image and a block size signal and for providing a plurality of gradient summing values signal, said gradient summing values generating unit comprising means for determining, for each pixel in a first given direction, a corresponding gradient between the pixel and a neighboring pixel and means for summing, for each pixel in the first direction, each of the corresponding determined gradient in a second direction to provide said plurality of gradient summing values signal; and
a level of distortion determining unit for receiving the plurality of gradient summing values signal and the block size signal and for providing a level of distortion signal, said level of distortion determining unit comprising means for computing a level of distortion for each of at least one potential block size using at least one of the gradient summing values, said level of distortion determining unit further comprising means for determining an actual block size using the computed at least one level of distortion and means for providing the level of distortion corresponding to the determined actual block size.

20. The apparatus as claimed in claim 19, further comprising a filtering unit for receiving said level of distortion signal and for providing a filtered level of distortion signal.

21. The method as claimed in claim 1, wherein said first given direction comprises an horizontal direction and said second direction comprises a vertical direction.

22. The method as claimed in claim 1, wherein said first given direction comprises a vertical direction and said second direction comprises an horizontal direction.

* * * * *